United States Patent
Antony

(10) Patent No.: US 10,938,747 B2
(45) Date of Patent: *Mar. 2, 2021

(54) CENTRAL SWITCH FOR COUPLING VIRTUAL DESKTOPS TO PERIPHERAL DEVICES

(71) Applicant: VMware, Inc., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,915

(22) Filed: May 1, 2017

(65) Prior Publication Data

US 2017/0237688 A1 Aug. 17, 2017

Related U.S. Application Data

(63) Continuation of application No. 14/532,653, filed on Nov. 4, 2014, now Pat. No. 9,639,386, which is a continuation of application No. 12/629,132, filed on Dec. 2, 2009, now Pat. No. 8,886,708.

(51) Int. Cl.

| G06F 15/173 | (2006.01) |
|---|---|
| H04L 12/947 | (2013.01) |
| G06F 3/023 | (2006.01) |
| G06F 3/038 | (2013.01) |
| G06F 9/455 | (2018.01) |
| G06F 13/38 | (2006.01) |
| G06F 13/40 | (2006.01) |
| H04L 12/935 | (2013.01) |
| H04L 12/931 | (2013.01) |

(52) U.S. Cl.
CPC .............. *H04L 49/25* (2013.01); *G06F 3/023* (2013.01); *G06F 3/038* (2013.01); *G06F 9/45533* (2013.01); *G06F 9/45558* (2013.01); *G06F 13/385* (2013.01); *G06F 13/4022* (2013.01); *H04L 49/30* (2013.01); *H04L 49/70* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| 6,223,202 B1 | 4/2001 | Bayeh | |
|---|---|---|---|
| 6,378,009 B1 | 4/2002 | Pinkston et al. | |
| 8,886,708 B2 | 11/2014 | Antony | |
| 2003/0009559 A1* | 1/2003 | Ikeda | H04L 29/06 |
| | | | 709/225 |
| 2003/0061392 A1* | 3/2003 | Chang | H04Q 11/0478 |
| | | | 709/250 |
| 2003/0149787 A1* | 8/2003 | Mangan | H04L 12/4641 |
| | | | 709/238 |

(Continued)

*Primary Examiner* — Bob A Phunkulh
(74) *Attorney, Agent, or Firm* — Fish & Richardson P.C.

(57) ABSTRACT

A method and system include compatibly interfacing a suitably adapted central switch in a computer network virtualization environment to one or more user-end peripheral device(s) to dispense with a need for a user-end thin client. The method and system also include appropriately routing a data associated with a direct and exclusive communication between a virtual machine on a host server including a number of virtual machines and the one or more user-end peripheral device(s) using the central switch.

19 Claims, 7 Drawing Sheets

(56) References Cited

U.S. PATENT DOCUMENTS

| | | | | |
|---|---|---|---|---|
| 2003/0172145 A1* | 9/2003 | Nguyen | G06Q 10/10 | 709/223 |
| 2004/0181590 A1* | 9/2004 | Liou | H04L 29/06027 | 709/217 |
| 2006/0190532 A1* | 8/2006 | Chadalavada | H04L 63/10 | 709/203 |
| 2006/0203460 A1* | 9/2006 | Aviv | H05K 7/1492 | 361/788 |
| 2007/0022176 A1* | 1/2007 | Kobayashi | H04L 12/12 | 709/217 |
| 2007/0250649 A1* | 10/2007 | Hickey | G06F 13/385 | 710/62 |
| 2008/0005414 A1* | 1/2008 | Liu | G06F 3/023 | 710/62 |
| 2008/0168118 A1 | 7/2008 | Hickey et al. | | |
| 2008/0201479 A1* | 8/2008 | Husain | G06F 9/445 | 709/227 |
| 2008/0201711 A1* | 8/2008 | Amir Husain | G06F 9/445 | 718/1 |
| 2008/0228865 A1* | 9/2008 | Cruzada | H04L 67/10 | 709/203 |
| 2008/0244122 A1* | 10/2008 | Rothman | H04L 69/14 | 710/73 |
| 2008/0301340 A1* | 12/2008 | Stotz | G06F 9/5077 | 710/68 |
| 2010/0107159 A1* | 4/2010 | Radhakrishnan | G06F 9/5055 | 718/1 |
| 2010/0107162 A1* | 4/2010 | Edwards | G06F 9/5077 | 718/1 |
| 2010/0275200 A1* | 10/2010 | Radhakrishnan | G06F 11/1438 | 718/1 |
| 2011/0019552 A1* | 1/2011 | Karaoguz | H04L 45/00 | 370/236 |
| 2011/0050712 A1* | 3/2011 | Jackson | G06F 9/45558 | 345/503 |
| 2011/0103389 A1* | 5/2011 | Kidambi | H04L 45/586 | 370/395.1 |
| 2011/0113472 A1* | 5/2011 | Fung | H04L 63/0227 | 726/3 |
| 2015/0058853 A1 | 2/2015 | Antony | | |

* cited by examiner

CENTRAL SWITCH FOR COUPLING VIRTUAL DESKTOPS TO PERIPHERAL DEVICES

CROSS REFERENCE TO RELATED APPLICATIONS

The present disclosure is a continuation of U.S. patent application Ser. No. 14/532,653, entitled "CENTRAL SWITCH FOR COUPLING VIRTUAL DESKTOPS TO PERIPHERAL DEVICES," filed Nov. 4, 2014, which is a continuation of U.S. patent application Ser. No. 12/629,132, entitled "CENTRALIZED COMPUTER NETWORK VIRTUALIZATION ENVIRONMENT," filed Dec. 2, 2009 (now U.S. Pat. No. 8,886,708), the contents of both of which are incorporated herein by reference in their entirety.

BACKGROUND

A computer network virtualization environment (e.g., Virtual Desktop Infrastructure (VDI)) may utilize thin clients at the user-end to access virtual desktops associated with users. The virtual desktops may be displayed in virtual machines (VMs) that the users may communicate with through the thin clients. The virtual machines may reside on a host server to which a network switch may be coupled to.

Thin clients may be low-end desktop computers, which may merely be used to connect to the remote desktops through a remote desktop connection (e.g., Microsoft®'s Remote Desktop Protocol (RDP) connection) or a web interface. FIG. 1 shows a thin client based computer network virtualization environment 100. The computer network virtualization environment 100 may include a host server 102 on which a number of VMs $104_1 \ldots 104_N$ reside. The VMs $104_1 \ldots 104_N$ may be mapped to respective thin clients $110_1 \ldots 110_N$ through a connection manager 106. The connection manager 106 may be software-based.

The thin clients $110_1 \ldots 110_N$ may connect to the remote desktops through the computer network 108 (e.g., Internet, Local Area Network (LAN), Wide Area Network (WAN)). A remote desktop connection may be required for the purpose, as discussed above. There may be some latency associated with connecting to the remote desktops. Patch management may also be required at the thin client end as the thin clients $110_1 \ldots 110_N$ may include operating systems.

SUMMARY

Disclosed are a method, an apparatus, and a system to realize a centralized computer network virtualization environment using a central switch.

In one aspect, a method includes compatibly interfacing a central switch in a computer network virtualization environment to one or more user-end peripheral device(s) to dispense with a need for a user-end thin client. The method also includes appropriately routing a data associated with a direct and exclusive communication between a virtual machine on a host server including a number of virtual machines and the one or more user-end peripheral device(s) using the central switch.

In another aspect, a method includes directly communicating exclusively between a virtual machine on a host server including a number of virtual machines and one or more user-end peripheral device(s) in a computer network virtualization environment through a central switch configured to appropriately route a data associated with the exclusive communication between the virtual machine on the host server and the one or more user-end peripheral device(s).

The method also includes converting the data associated with the exclusive communication between the virtual machine and the one or more user-end peripheral device(s) to an appropriate format recognizable by the one or more user-end peripheral device(s) and the host server using the central switch and/or a user-end converter during the routing of the data associated with the exclusive communication between the virtual machine and the one or more user-end peripheral device(s).

In yet another aspect, a central switch includes a host server interface configured to compatibly interface the central switch to a host server in a computer network virtualization environment. The host server includes a plurality of virtual machines, each of which is associated with one or more user-end peripheral device(s). The central switch also includes a converter interface configured to compatibly interface the central switch to a user-end converter associated with the one or more user-end peripheral device(s).

A data associated with a direct and exclusive communication between a virtual machine on the host server and the associated one or more user-end peripheral device(s) is configured to be appropriately routed to the host server or the associated one or more user-end peripheral device(s) through the host server interface and the converter interface.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

DETAILED DESCRIPTION

Example embodiments, as described below, may be used to realize a centralized computer network virtualization environment through a central switch. Although the present embodiments have been described with reference to specific example embodiments, it will be evident that various modifications and changes may be made to these embodiments without departing from the broader spirit and scope of the various embodiments.

Figure 1:
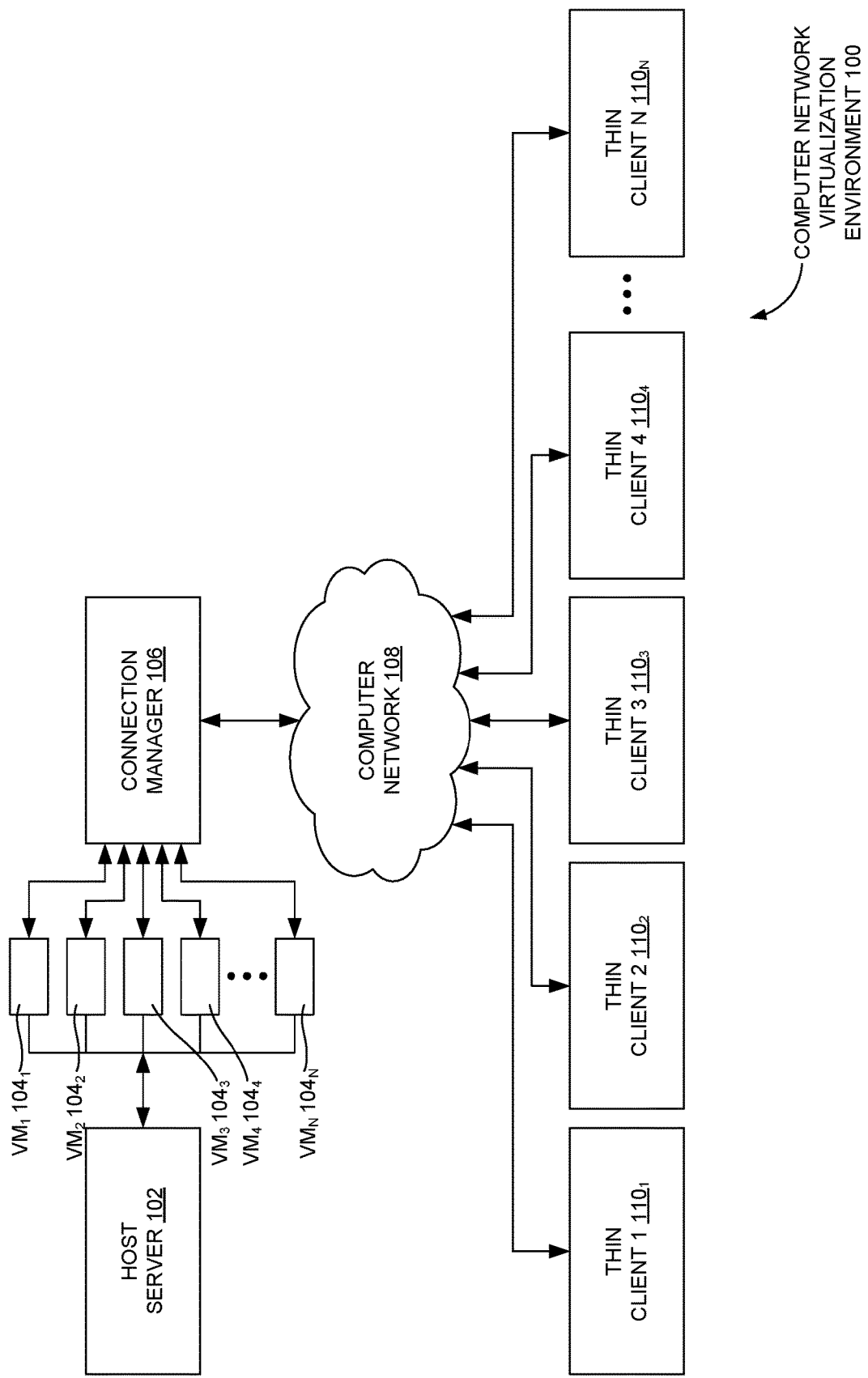
FIG. 1 is a system view of a thin client based computer network virtualization environment, according to one or more embodiments.
Figure 2:
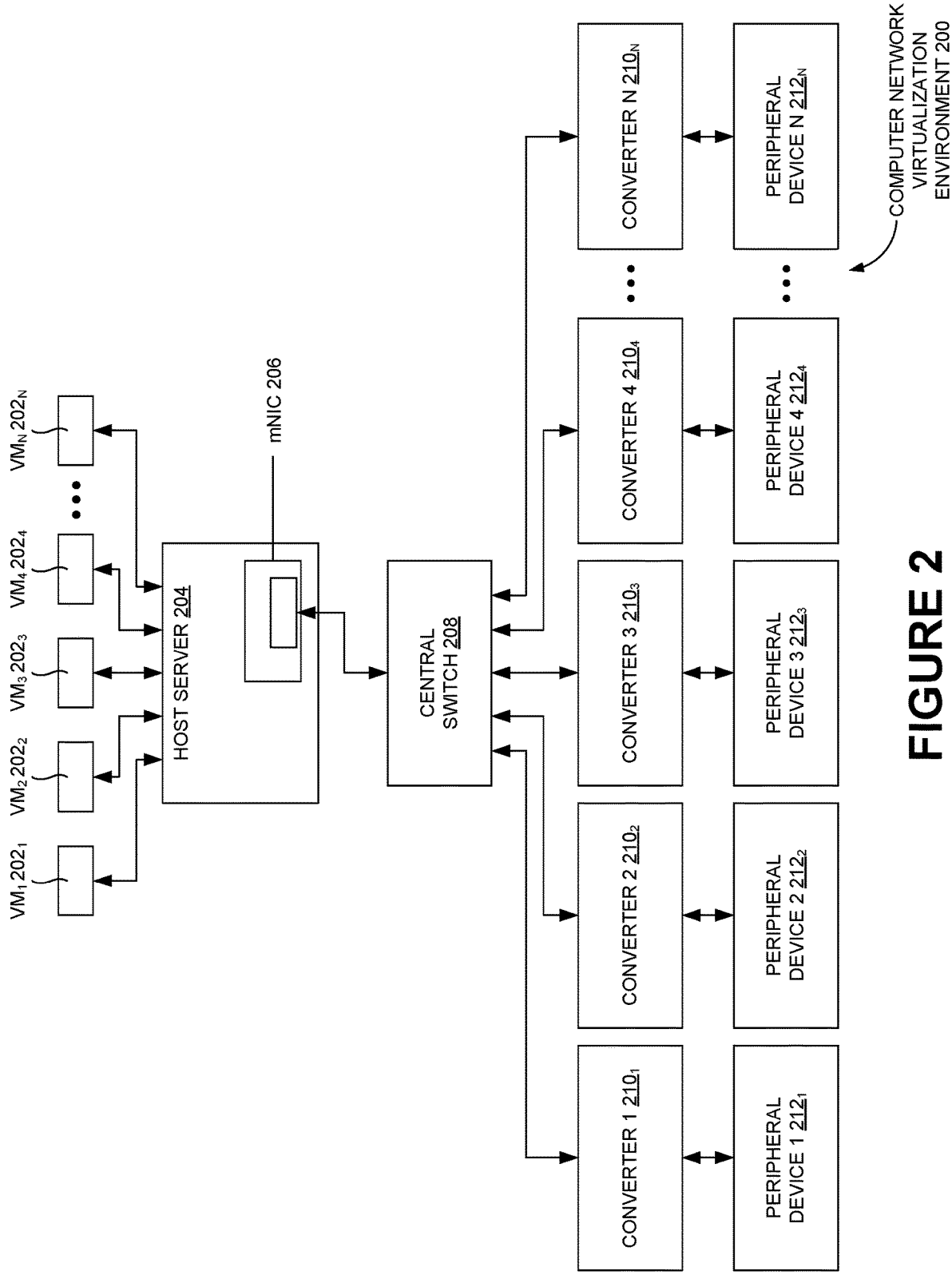
FIG. 2 is system view of a computer network virtualization environment, according to one or more embodiments.

FIG. 2 shows a computer network virtualization environment 200, according to one or more embodiments. In one or more embodiments, the computer network virtualization environment 200 may include a host server 204 configured to host a number of VMs ($202_1 \ldots 202_N$). In one or more embodiments, VMs $202_1 \ldots 202_N$ may be virtualized desktops associated with end users who may communicate exclusively with VMs $202_1 \ldots 202_N$ directly through the corresponding peripheral devices $212_1 \ldots 212_N$. For example, there may be a direct and exclusive communication between peripheral device $212_1$ and VM $202_1$, peripheral device $212_2$ and VM $202_2$, peripheral device $212_3$ and VM $202_3$, peripheral device $212_N$ and VM $202_N$ etc. In one or more embodiments, peripheral device $212_1 \ldots 212_N$ may each be a physical Keyboard, Video, Mouse (KVM), i.e., a physical keyboard, a physical video display unit (or computer monitor), and a physical mouse or any combination of a physical keyboard, a computer monitor, a physical mouse and any other IO unit/USB port that may be used by end user.

In one or more embodiments, communication between peripheral device $212_1 \ldots 212_N$ and a corresponding VM $202_1 \ldots 202_N$ may be accomplished through a central switch 208. In one or more embodiments, the central switch 208 may couple to a management network interface card (mNIC) of the host server 204. In one or more embodiments, mNIC may be configured to assign an identification information (e.g., Media Access Control (MAC) address) to each of the VMs $202_1 \ldots 202_N$ on the host server 204. In one or more embodiments, the central switch 208 may not only perform the functions associated with a normal network switch but also may segregate packet data (e.g., display Internet Protocol (IP) packets) associated with each VM $202_1 \ldots 202_N$ and transmit the packet data to interfaces (e.g., ports) available on the central switch 208 that are configured to couple to converters $210_1 \ldots 210_N$ interfaced with the peripheral devices $212_1 \ldots 212_N$.

In one or more embodiments, converters $210_1 \ldots 210_N$ may each convert a peripheral signal generated from the packet data segregated by the central switch 208 to a format that may be recognizable by the peripheral devices $212_1 \ldots 212_N$. In one or more embodiments, the converters $210_1 \ldots 210_N$ may be a PS/2+video to CAT5 dongle, a PS/2+video CAT6 dongle, a Universal Serial Bus (USB)+ video dongle, PS/2 dongle and/or a PS/2/USB+video cable to convenience compatibility with a number of peripheral devices $212_1 \ldots 212_N$ such as keyboards, computer monitors, mouse and other user end devices. In one or more embodiments, the central switch 208 may couple to the converters $210_1 \ldots 210_N$ through a Registered Jack (RJ) 45 interface. In one or more embodiments, the central switch 208 may also couple to the host server 204 through an RJ45 interface. In one or more embodiments, wireless coupling between the central switch 208, the host server 204 and/or the converters $210_1 \ldots 210_N$ may also be employed.

Figure 3:
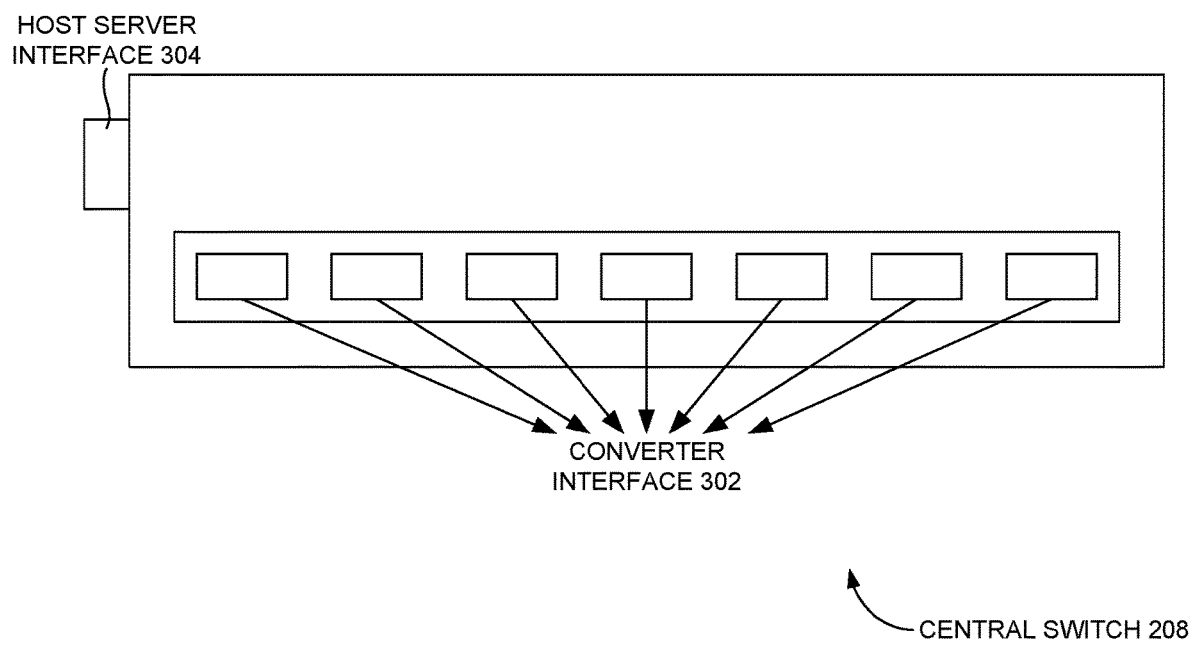
FIG. 3 is a schematic view of a central switch, according to one or more embodiments.

FIG. 3 shows a central switch 208, according to one or more embodiments. In one or more embodiments, the central switch 208 may include a converter interface 302 (e.g., RJ45 port) configured to be utilized in the coupling of the central switch 208 to the converters $210_1 \ldots 210_N$. In one or more embodiments, the converters $210_1 \ldots 210_N$ associated with individual peripheral devices $212_1 \ldots 212_N$ may be coupled to a corresponding converter interface 302 on the central switch 208. In one or more embodiments, the central switch 208 may also include a host server interface 304 (e.g., RJ45 interface) configured to couple to the host server 204. In one or more embodiments, one end of the central switch 208 may be configured to receive/transmit packet data (e.g., display IP packets) from/to the host server 204 and the other end may be configured to transmit/receive peripheral signals to/from the converters $210_1 \ldots 210_N$, as will be discussed below. In one or more embodiments, the peripheral signals may be compatible with the user-end converters $210_1 \ldots 210_N$, which may then convert the peripheral signals to a format compatible with the peripheral devices $212_1 \ldots 212_N$. For example, a PS/2 CAT5 dongle may convert peripheral signals to a format suitable to CAT5 cables.

In one or more embodiments, the central switch 208 may route a data associated with the direct and exclusive communication between a VM $202_1 \ldots 202_N$ and the host server 204. In one or more embodiments, the direct and exclusive communication between the VM $202_1 \ldots 202_N$ and the host server 204 may include transmitting the data from the host server 204 including the VM $202_1 \ldots 202_N$ to the corresponding peripheral device $212_1 \ldots 212_N$ and/or transmitting the data from the peripheral device $212_1 \ldots 212_N$ to the host server 204 including the VM $202_1 \ldots 202_N$.

Figure 4:
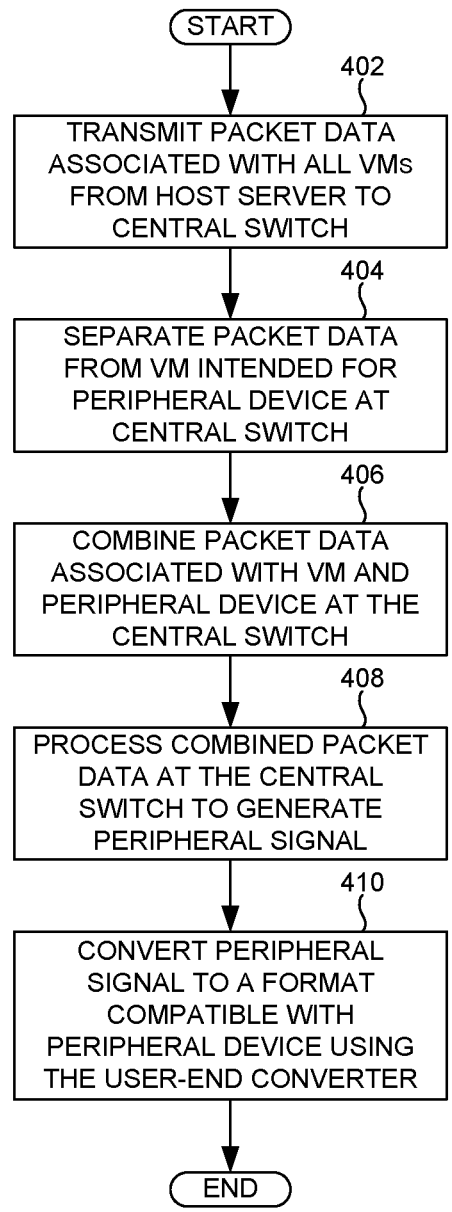
FIG. 4 is a flowchart detailing the operations involved in transmitting data from a host server including a virtual machine to a corresponding peripheral device, according to one or more embodiments.

FIG. 4 shows a flowchart detailing the operations involved in transmitting data from the host server 204 including the VM $202_1 \ldots 202_N$ to the corresponding peripheral device $212_1 \ldots 212_N$, according to one or more embodiments. In one or more embodiments, operation 402 may involve transmitting packet data associated with all VMs $202_1 \ldots 202_N$ from the host server 204 to the central switch 208. In one or more embodiments, the packet data may be, for example, Transmission Control Protocol/Internet Protocol (TCP/IP) packets. In one or more embodiments, operation 404 may involve separating the packet data from the VM $202_1 \ldots 202_N$ intended for the peripheral device $212_1 \ldots 212_N$ at the central switch 208 based on an identification data associated with the VM $202_1 \ldots 202_N$. In one or more embodiments, for example, a TCP port number may be utilized as the identification data associated with the VM $202_1 \ldots 202_N$. Therefore, the TCP/IP packets may be separated at the central switch 208 based on the TCP port number (compatible through the host server interface 304) associated with the VM $202_1 \ldots 202_N$.

In one or more embodiments, operation 406 may include combining the packet data associated with the communication between the VM $202_1 \ldots 202_N$ and the corresponding peripheral device $212_1 \ldots 212_N$ at the central switch 208. Therefore, the separated packet data associated with each VM $202_1 \ldots 202_N$ may be combined at the central switch 208. In one or more embodiments, operation 408 may include processing the combined packet data at the central switch 208 to generate a peripheral signal configured to be input to the appropriate converter $210_1 \ldots 210_N$. In one or more embodiments, the peripheral signal may be input to the appropriate converter $210_1 \ldots 210_N$ through the appropriate converter interface 302 (e.g., RJ45 interface). In one or more embodiments, the peripheral signal associated with the exclusive communication between the VM $202_1 \ldots 202_N$ and the corresponding peripheral device $212_1 \ldots 212_N$ may need to be converted to an appropriate format that is recognizable by the peripheral device $212_1 \ldots 212_N$.

Therefore, in one or more embodiments, operation 410 may involve converting the peripheral signal to a format compatible with the peripheral device $212_1 \ldots 212_N$ using the corresponding converter $210_1 \ldots 210_N$. In one or more embodiments, when an appropriate converter $210_1 \ldots 210_N$ is coupled to the converter interface 302, the peripheral signal may be converted to a format recognizable by the peripheral device $212_1 \ldots 212_N$ (e.g., keyboard, video, mouse).

Figure 5:
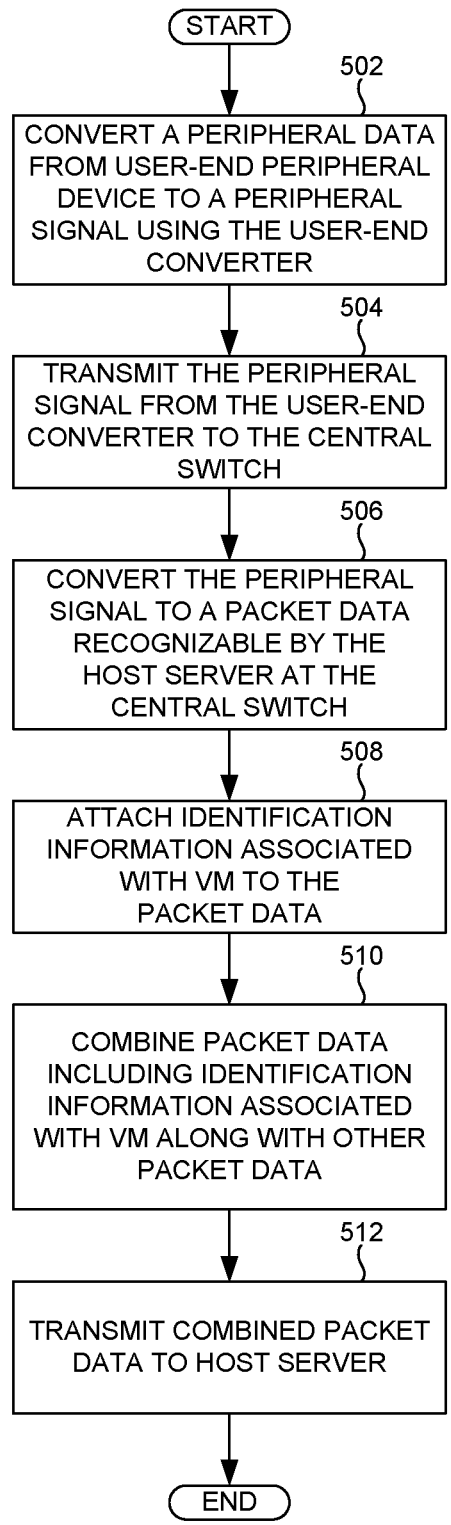
FIG. 5 is a flowchart detailing the operations involved in transmitting data from the peripheral device to the host server including the corresponding virtual machine, according to one or more embodiments.

FIG. 5 shows a flowchart detailing the operations involved in transmitting data from the peripheral device $212_1 \ldots 212_N$ to the host server 204 including the corresponding VM $202_1 \ldots$ VM $202_N$, according to one or more embodiments. In one or more embodiments, operation 502 may involve converting a peripheral data from the peripheral device $212_1 \ldots 212_N$ to a peripheral signal configured to be compatible with the converter interface 302 (e.g., RJ45 interface) of the central switch 208 using the appropriate converter $210_1 \ldots 210_N$. In one or more embodiments, operation 504 may involve transmitting the peripheral signal from the converter $210_1 \ldots 210_N$ to the central switch 208, i.e., through the converter interface 302 (e.g., RJ45 interface).

In one or more embodiments, operation 506 may involve converting the peripheral signal to a packet data (e.g., TCP/IP packets) recognizable by the host server 204 including the corresponding VM $202_1 \ldots 202_N$ at the central switch 208. In one or more embodiments, operation 508 may involve attaching an identification information associated with the appropriate VM $202_1 \ldots 202_N$ to the packet data recognizable by the host server 204 at the central switch 208. In one or more embodiments, the identification information may include, for example, a TCP/IP port number that is VM $(202_1 \ldots 202_N)$ specific.

In one or more embodiments, operation 510 may involve combining, at the central switch 208, the packet data including the identification information associated with the appropriate VM $202_1 \ldots 202_N$ along with other packet data including corresponding VM $(202_1 \ldots 202_N)$ specific identification information thereof. In one or more embodiments, operation 512 may then involve transmitting the combined packet data to the host server 204 including the number of VMs $202_1 \ldots 202_N$.

Therefore, in one or more embodiments, the abovementioned direct communication between a VM $202_1 \ldots 202_N$, which may be a virtualized desktop associated with a user, and a corresponding peripheral device $212_1 \ldots 212_N$ configured to be operated by the user may allow for dispensing with the need for a thin client at the user-end in a computer network virtualization environment 200. In one or more embodiments, the utilization of the central switch 208 may facilitate the users to access the virtualized desktops (VMs $202_1 \ldots 202_N$) without any non-peripheral device hardware at the user-end. In one or more embodiments, converters $210_1 \ldots 210_N$ may suffice at the user-end.

In one or more embodiments, the user-end requirement of booting the thin clients and connecting to the remote desktops using, for example, Microsoft®'s Remote Desktop Protocol (RDP) connection or a web interface may be dispensed with. In one or more embodiments, the central switch 208 may be utilized to seamlessly switch between VMs $202_1 \ldots 202_N$ and the corresponding peripheral devices $212_1 \ldots 212_N$.

Assuming a thin client based solution in a computer network virtualization environment where there are 24 users and 1 host server, 24 thin clients, along with 1 network switch, may be required. In one or more embodiments, assuming the same number of users in the computer network virtualization environment 200 shown in FIG. 2, the computer network virtualization environment 200 may merely require 24 user-end converters $210_1 \ldots 210_N$ (e.g., PS/2 CAT5 dongles), along with the central switch 208. In one or more embodiments, the user-end converters $210_1 \ldots 210_N$ may be more portable compared to the traditional thin clients. Additionally, in one or more embodiments, the lack of thin clients in the computer network virtualization environment 200 may provide for savings associated with hardware costs.

In one or more embodiments, the central switch 208 may be utilized, for example, in conjunction with TCP/IP switches in a computer network, depending on requirements thereof. In one or more embodiments, the lack of the need to connect to the remote desktop using, for example, Microsoft®'s RDP connection may provide for a real-time performance. In one or more embodiments, the end-user's experience may be similar to a native experience, i.e., the experience of directly working with a physical version of the remote desktop at the user-end.

In one or more embodiments, latency associated with connecting to the remote desktop using, for example, Microsoft®'s RDP connection in the case of a thin client based solution may be a non-issue in the computer network virtualization environment 200 of FIG. 2. In one or more embodiments, an end-user need to do patch management in a thin client based solution may also be a non-issue in the computer network virtualization environment 200 of FIG. 2. In one or more embodiments, the only user-end task required in the computer network virtualization environment 200 of FIG. 2 may be a conversion of a peripheral signal to a format recognizable by the peripheral devices $212_1 \ldots 212_N$, as described above.

In one or more embodiments, the central switch 208 may be compatible with existing network (e.g., Local Area Network (LAN)) infrastructure. In one or more embodiments, this may be because the central switch 208 may employ a standard converter interface 302 (e.g., RJ45 interface) and a host server interface 304 (e.g., RJ45 interface).

In one or more embodiments, the user-end processing required in traditional thin client based solutions may be shifted to the central switch 208 in the computer network virtualization environment 200 of FIG. 2. In one or more embodiments, up until the host server interface 304 of the central switch 208, data associated with the communication between the VMs $202_1 \ldots 202_N$ and the peripheral devices $212_1 \ldots 212_N$ may be in the form of standard TCP/IP packets, as discussed above. Therefore, in one or more embodiments, standard switching using the central switch 208 may suffice to manage the TCP/IP packets.

In one or more embodiments, the central switch 208 may separate packets from each VM $202_1 \ldots 202_N$ based on the peripheral device $212_1 \ldots 212_N$ (e.g., video packet, mouse packet, keyboard packet etc.). As described above, in one or more embodiments, packet data may have an associated port number in the TCP/IP stack. In one or more embodiments, packet data specific to VMs $202_1 \ldots 202_N$ may be segregated using the port number as the identification data. In one or more embodiments, therefore, the central switch 208 may perform additional functions as compared to standard network switches. Thus, in one or more embodiments, the central switch may be a KVM switch suitably adapted to the computer network virtualization environment 200 of FIG. 2.

In one or more embodiments, the additional functionality associated with the central switch 208 may pave the way for a centralized approach to desktop virtualization as the need for user-end hardware may be completely dispensed with. In one or more embodiments, the user-end maintenance requirements may be minimal in the computer network virtualization environment 200 of FIG. 2.

In one or more embodiments, the central switch 208 implementation may provide for improved security in the computer network virtualization environment 200 of FIG. 2. In one or more embodiments, a user may not be able to access the virtual desktop associated with another user because only data associated with the exclusive communication between the user-end peripheral device $212_1 \ldots 212_N$ and the VM $202_1 \ldots 202_N$ may be available to the user. In the case of a traditional thin client based solution, a user may receive packet data associated with another user (i.e., another virtual desktop), which may provide for lesser security compared to the computer network virtualization environment 200.

Figure 6:
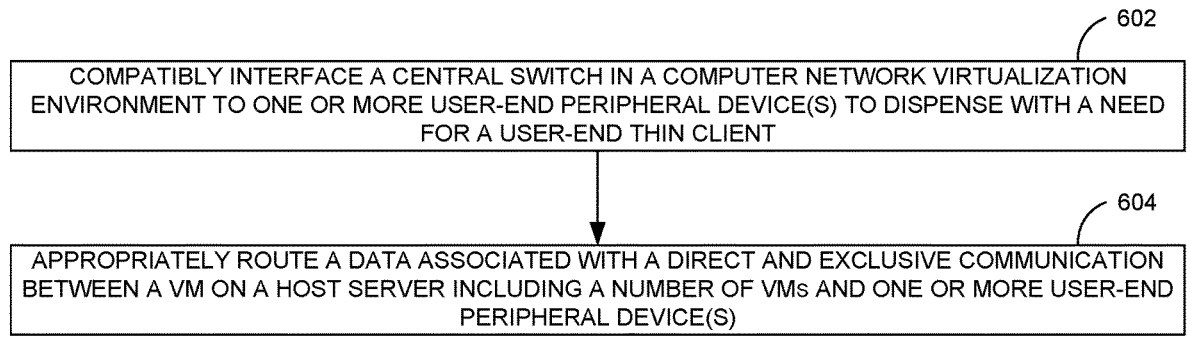
FIG. 6 is a process flow diagram detailing the operations involved in realizing a centralized computer network virtualization environment, according to one or more embodiments.

FIG. 6 shows a process flow diagram detailing the operations involved in realizing a centralized computer network virtualization environment 200, according to one or more embodiments. In one or more embodiments, operation 602 may involve compatibly interfacing a central switch 208 in the computer network virtualization environment 200 to one or more user-end peripheral device(s) $212_1 \ldots 212_N$ to dispense with a need for a user-end thin client. In one or more embodiments, the central switch 208 may be compatibly interfaced with the one or more user-end peripheral devices(s) $212_1 \ldots 212_N$ through the converter interface 302 (e.g., RJ45 interface) and the user-end converters $210_1 \ldots 210_N$.

In one or more embodiments, operation 604 may involve appropriately routing a data associated with the direct and exclusive communication between a VM $202_1 \ldots 202_N$ on a host server 204 including a number of VMs $202_1 \ldots 202_N$ and the one or more user-end peripheral device(s) $212_1 \ldots 212_N$ using the central switch 208.

Figure 7:
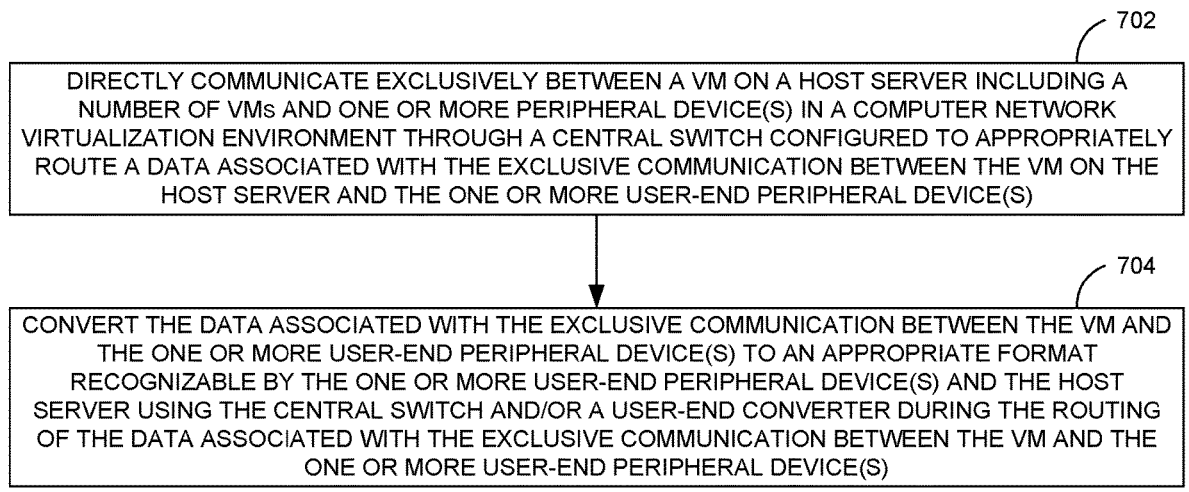
FIG. 7 is a process flow diagram detailing the operations involved in directly and exclusively communicating with an appropriate remote desktop from a user-end, according to one or more embodiments.

FIG. 7 shows a process flow diagram detailing the operations involved in directly and exclusively communicating with an appropriate remote desktop from a user-end, according to one or more embodiments. In one or more embodiments, operation 702 may involve directly communicating exclusively between a VM $202_1 \ldots 202_N$ on a host server 204 including a number of VMs $202_1 \ldots 202_N$ and one or more user-end peripheral device(s) $212_1 \ldots 212_N$ in a computer network virtualization environment 200 through a central switch 208. In one or more embodiments, the central switch 208 may be configured to appropriately route a data associated with the exclusive communication between the VM $202_1 . 202_N$ on the host server 204 and the one or more user-end peripheral device(s) $212_1 \ldots 212_N$.

In one or more embodiments, operation 704 may involve converting the data associated with the exclusive communication between the VM $202_1 \ldots 202_N$ and the one or more user-end peripheral device(s) $212_1 \ldots 212_N$ to an appropriate format recognizable by the one or more user-end peripheral device(s) $212_1 \ldots 212_N$ and the host server 204 using the central switch 208 and/or a user-end converter $210_1 \ldots 210_N$ during the routing of the data associated with the exclusive communication between the VM $202_1 \ldots 202_N$ and the one or more user-end peripheral device(s) $210_1 \ldots 210_N$.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer device), and may be performed in any order (e.g., including using means for achieving the various operations). Accordingly, the specification and drawings are to be regarded in an illustrative rather than a restrictive sense.

What is claimed is:

1. A system comprising:
   a host computer system configured to host a plurality of virtual machines, wherein each virtual machine of the plurality of virtual machines is running a virtual desktop, and wherein each user of a plurality of users is associated with a particular virtual machine;
   a plurality of peripheral devices, wherein each user is associated with one or more peripheral devices of the plurality of peripheral devices, and wherein each user interacts with the associated virtual desktop using the one or more peripheral devices; and
   a switch configured to separate packet data received from each of a plurality of virtual machines into a corresponding plurality of peripheral signals, each peripheral signal directed to a particular peripheral device of the plurality of peripheral devices and route the packet data received from the virtual machine to the particular peripheral device of the corresponding user of the virtual machine, wherein the switch provides for peripheral signal communication between each virtual machine and the particular peripheral device associated with each respective user, wherein the particular peripheral device comprises a keyboard, a video display unit or a mouse.

2. The system of claim 1, wherein the peripheral signal communication does not require a thin client associated with one or more of the peripherals and the use of a remote desktop protocol.

3. The system of claim 1, wherein the switch routes data from a particular virtual machine to a particular peripheral device by determining an identifier of the virtual machine corresponding to a received data packet and generating a peripheral signal from the data packet that is configured to be sent to the peripheral device.

4. The system of claim 1, wherein the switch routes data from a particular peripheral device to a particular virtual machine includes associating particular identification information associated with the particular virtual machine to the data, the particular identification information including a port number associated with the particular virtual machine.

5. The system of claim 1, further comprising:
   a plurality of converters, wherein each converter is configured to convert a received signal from the switch to a format compatible with a particular peripheral device.

6. The system of claim 5, wherein the converter convers a received signal from the particular peripheral device to a format compatible with the virtual machine.

7. The system of claim 1, wherein the switch is further configured to combine packets received from a particular virtual machine and directed to a particular peripheral device prior to sending the packets to the particular peripheral device.

8. A method comprising:
   receiving, at a switch, a first packet from a virtual machine of a plurality of virtual machines hosted on a host computing system, wherein each virtual machine is running a virtual desktop associated with a corresponding user of a plurality of users;
determining, at the switch, a first peripheral device associated with a particular user of the virtual machine wherein the first peripheral device comprises a keyboard, a video display unit or a mouse;
separating the received first packet from each of a plurality of virtual machine into a corresponding plurality of peripheral signals, each peripheral signal directed to the first peripheral device associated with the particular user;
routing the received first packet from the virtual machine to the first peripheral device associated with the particular user;
receiving a second packet from a second peripheral device associated with the particular user; and
routing the second packet to the virtual machine associated with the particular user,
wherein, the routing between the virtual machine and the first and second peripheral devices provides for peripheral signal communication between the virtual machine and the first and second peripheral devices allowing the particular user to interact with the corresponding virtual desktop.

9. The method of claim 8, wherein routing the first packet from the virtual machine to the first peripheral device includes determining an identifier of the virtual machine corresponding to a received data packet and generating a peripheral signal from the data packet that is configured to be sent to the peripheral device.

10. The method of claim 8, wherein routing the second signal from the second peripheral device to the virtual machine includes associating particular identification information associated with the virtual machine to the data, the particular identification information including a port number associated with the virtual machine.

11. The method of claim 8, wherein routing the received first packet from the virtual machine to the first peripheral device associated with the particular user includes routing the first packet to a converter associated with the first peripheral device, the converter configured to convert the received first packet to a format compatible with the first peripheral device.

12. The method of claim 11, wherein routing the received second signal from the second peripheral device to the virtual machine includes converting the second packet to a format compatible with the virtual machine.

13. The method of claim 8, comprising combining packets received from the virtual machine and directed to the first peripheral device prior to sending the packets to the first peripheral device.

14. One or more non-transitory computer readable storage media containing instructions that when executed cause one or more processors to perform operations comprising:
receiving, at a switch, a first packet from a virtual machine of a plurality of virtual machines hosted on a host computing system, wherein each virtual machine is running a virtual desktop associated with a corresponding user of a plurality of users;
determining, at the switch, a first peripheral device associated with a particular user of the virtual machine wherein the first peripheral device comprises a keyboard, a video display unit or a mouse; separating the received first packet from each of a plurality of virtual machine into a corresponding plurality of peripheral signals, each peripheral signal directed to the first peripheral device associated with the particular user;
routing the received first packet from the virtual machine to the first peripheral device associated with the particular user;
receiving a second packet from a second peripheral device associated with the particular user; and
routing the second packet to the virtual machine,
wherein, the routing between the virtual machine and the first and second peripheral devices provides for peripheral signal communication between the virtual machine and the first and second peripheral devices allowing the particular user to interact with the corresponding virtual desktop.

15. The one or more non-transitory computer readable storage media of claim 14, wherein routing the first packet from the virtual machine to the first peripheral device includes determining an identifier for the virtual machine corresponding to a received data packet and generating a peripheral signal from the data packet that is configured to be sent to the peripheral device.

16. The one or more non-transitory computer readable storage media of claim 14, wherein routing the second signal from the second peripheral device to the virtual machine includes associating particular identification information associated with the virtual machine to the data, the particular identification information including a port number associated with the virtual machine.

17. The one or more non-transitory computer readable storage media of claim 14, wherein routing the received first packet from the virtual machine to the first peripheral device associated with the particular user includes routing the first packet to a converter associated with the first peripheral device, the converter configured to convert the received first packet to a format compatible with the first peripheral device.

18. The one or more non-transitory computer readable storage media of claim 17, wherein routing the received second signal from the second peripheral device to the virtual machine includes converting the second packet to a format compatible with the virtual machine.

19. The one or more non-transitory computer readable storage media of claim 14, comprising combining packets received from the virtual machine and directed to the first peripheral device prior to sending the packets to the first peripheral device.

* * * * *